US006970296B2

(12) United States Patent
Blümel

(10) Patent No.: US 6,970,296 B2
(45) Date of Patent: Nov. 29, 2005

(54) SIGNALING DEVICE FOR TRAFFIC SIGNALS

(75) Inventor: Simon Blümel, Schierling (DE)

(73) Assignee: Osram GmbH, Munich (DE)

( * ) Notice: Subject to any disclaimer, the term of this patent is extended or adjusted under 35 U.S.C. 154(b) by 6 days.

(21) Appl. No.: 10/292,333

(22) Filed: Nov. 12, 2002

(65) Prior Publication Data

US 2003/0076237 A1   Apr. 24, 2003

Related U.S. Application Data

(63) Continuation of application No. PCT/DE01/01334, filed on Apr. 5, 2001.

(30) Foreign Application Priority Data

May 10, 2000  (DE) ................................ 100 22 713

(51) Int. Cl.[7] ....................... G02B 27/30; G02B 27/10; G03B 21/60
(52) U.S. Cl. ...................... 359/641; 359/619; 359/457; 359/742
(58) Field of Search ................................ 359/619, 641, 359/457, 742, 626, 455; 362/333, 244; 340/815.75, 340/815.45

(56) References Cited

U.S. PATENT DOCUMENTS

| | | | | |
|---|---|---|---|---|
| 1,279,638 A | * | 9/1918 | Blake | 340/815.68 |
| 2,748,263 A | * | 5/1956 | Franck et al. | 362/333 |
| 3,576,563 A | * | 4/1971 | Scott et al. | 385/115 |
| 3,780,285 A | * | 12/1973 | Appeldorn et al. | 362/311 |
| 3,851,165 A | * | 11/1974 | Beck et al. | 362/268 |
| 4,147,408 A | * | 4/1979 | Plummer | 359/457 |
| 4,158,222 A | * | 6/1979 | Cook | 362/269 |
| 4,374,609 A | * | 2/1983 | Lange | 359/455 |
| 4,773,731 A | * | 9/1988 | Goldenberg et al. | 359/457 |
| 4,785,385 A | * | 11/1988 | Holst | 362/309 |
| 5,042,911 A | | 8/1991 | Levin | |
| 5,289,311 A | | 2/1994 | McClelland et al. | |
| 5,400,114 A | * | 3/1995 | Yoshida et al. | 359/457 |
| 5,584,570 A | * | 12/1996 | Binder et al. | 362/293 |
| 5,608,550 A | * | 3/1997 | Epstein et al. | 349/57 |
| 5,612,741 A | * | 3/1997 | Loban et al. | 348/383 |
| 5,644,431 A | * | 7/1997 | Magee | 359/619 |
| 5,742,438 A | * | 4/1998 | Conner et al. | 359/743 |
| 5,896,093 A | * | 4/1999 | Sjobom | 340/815.75 |
| 6,061,179 A | * | 5/2000 | Inoguchi et al. | 359/464 |

(Continued)

FOREIGN PATENT DOCUMENTS

DE        42 06 056 C1   6/1993

(Continued)

OTHER PUBLICATIONS

Balashov et al., Illumination Device for Generating Non-Symmetric Light Beam (PCT), Optical Lens Array and Optical Lens, WO99/50596, Oct. 7, 1999.*

*Primary Examiner*—Ricky Mack
(74) *Attorney, Agent, or Firm*—Laurence A. Greenberg; Werner H. Stemer; Ralph E. Locher

(57) ABSTRACT

A signaling device includes a light source and a Fresnel optical system. Constructed in the form of ellipses on its rear side, the Fresnel optical system has defocusing lenses that form elongated focal areas in the focal plane. Despite the use of a light source of small lateral extent, the signaling device has a radiation characteristic with a large aperture angle.

15 Claims, 4 Drawing Sheets

U.S. PATENT DOCUMENTS

| | | | |
|---|---|---|---|
| 6,075,648 A * | 6/2000 | Yamamoto et al. | 359/619 |
| 6,226,120 B1 * | 5/2001 | Feldman | 359/399 |
| 6,266,476 B1 * | 7/2001 | Shie et al. | 385/147 |
| 6,273,591 B1 * | 8/2001 | Albou | 362/333 |
| 6,352,359 B1 * | 3/2002 | Shie et al. | 362/522 |
| 6,375,326 B2 * | 4/2002 | Myers | 353/10 |
| 6,529,678 B2 * | 3/2003 | Shie et al. | 385/147 |
| 6,616,299 B2 * | 9/2003 | Martineau | 362/244 |
| 2002/0105801 A1 * | 8/2002 | Martineau | 362/244 |

FOREIGN PATENT DOCUMENTS

| | | | | |
|---|---|---|---|---|
| DE | 198 37 224 A1 | | 3/2000 | |
| EP | 0509679 A2 | * | 10/1992 | B60Q 1/26 |
| GB | 2194321 A | * | 3/1988 | F21Q 3/00 |
| JP | 03282699 A | * | 12/1991 | G08G 1/095 |
| JP | 05120902 A | * | 5/1993 | F21M 3/12 |
| JP | 08054685 A | * | 2/1996 | G03B 21/62 |
| WO | WO 00/11498 | | 3/2000 | |

* cited by examiner

SIGNALING DEVICE FOR TRAFFIC SIGNALS

CROSS-REFERENCE TO RELATED APPLICATION

This application is a continuation of copending International Application No. PCT/DE01/01334, filed Apr. 5, 2001, which designated the United States and was not published in English.

BACKGROUND OF THE INVENTION

Field of the Invention

The invention relates to a signaling device for traffic signals having a light source and an assigned collimator that has contiguously disposed scattering elements on a surface facing the light source.

Signaling devices, in general, are known to the person skilled in the art. In particular, signaling devices exist in which a light source emits signaling light that is collimated by a Fresnel optical system. Spherical defocusing lenses are constructed on a side of the Fresnel plate facing the light source. Due to the defocusing lenses, mutually parallel light beams falling onto the Fresnel optical system are imaged in the focal plane not at punctiform foci, but on areally extended focal areas.

Signaling devices for traffic signals must have a prescribed radiation characteristic. On the other hand, the light sources used for conventional signaling devices do not have the sufficiently great extent, required for the purpose, in a direction transverse to the optical axis. This means that the aperture angle of the beam emerging from the Fresnel optical system is small. Consequently, it is generally necessary also to provide an additional scattering lens that expands the beam.

Another possibility is to configure the light-emitting diodes on a printing circuit board in the focal plane of the Fresnel optical system in accordance with the required radiation characteristic. However, in such a case, there exists a problem of having the printed circuit board be rendered correspondingly large.

SUMMARY OF THE INVENTION

It is accordingly an object of the invention to provide a signaling device for traffic signals that overcomes the hereinafore-mentioned disadvantages of the heretofore-known devices of this general type and that creates a signaling device for traffic signals that produces a beam of large aperture angle despite a compact light source.

With the foregoing and other objects in view, there is provided, in accordance with the invention, signaling device for traffic signals, including a light source and a collimator associated with the light source, the collimator having a surface facing the light source, the surface having contiguously disposed scattering elements formed as prominences elongated in a direction along the surface.

According to the invention, the scattering elements are elongated prominences in a direction along the surface.

Because elongated prominences are disposed contiguously on the surface facing the light source, parallel light beams falling onto the collimator are imaged in the focal plane of the collimator not at foci, but on areally extended focal areas. It suffices, when one point of light from the light source is located in the focal area associated with a direction of emission, to permit light to emerge from the signaling device in the relevant direction. A small number of points of light in a focal area are sufficient at the edge regions of the light source because, by contrast with the emission in the direction of the optical axis, only a very low luminous intensity is required at the edges of the radiation characteristic.

In accordance with another feature of the invention, the collimator is a Fresnel optical system, in particular, a Fresnel lens or a Fresnel plate.

In accordance with a further feature of the invention, the Fresnel optical system has a rear side; and the prominences are disposed on the rear side.

In accordance with an added feature of the invention, the prominences have elliptical base areas on the surface of the collimator.

In accordance with an additional feature of the invention, the prominences are formed by or are segments of ellipsoids.

In accordance with yet another feature of the invention, the collimator has a focal plane and the light source is disposed at or in the focal plane of the collimator.

In accordance with yet a further feature of the invention, the light source has a field with light-emitting diodes.

With the objects of the invention in view, in a signaling device having a light source, there is also provided a focusing device, including a collimator associated with the light source, the collimator having a surface facing the light source, the surface having contiguously disposed scattering elements formed as prominences elongated in a direction along the surface.

Other features that are considered as characteristic for the invention are set forth in the appended claims.

Although the invention is illustrated and described herein as embodied in a signaling device for traffic signals, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1B:
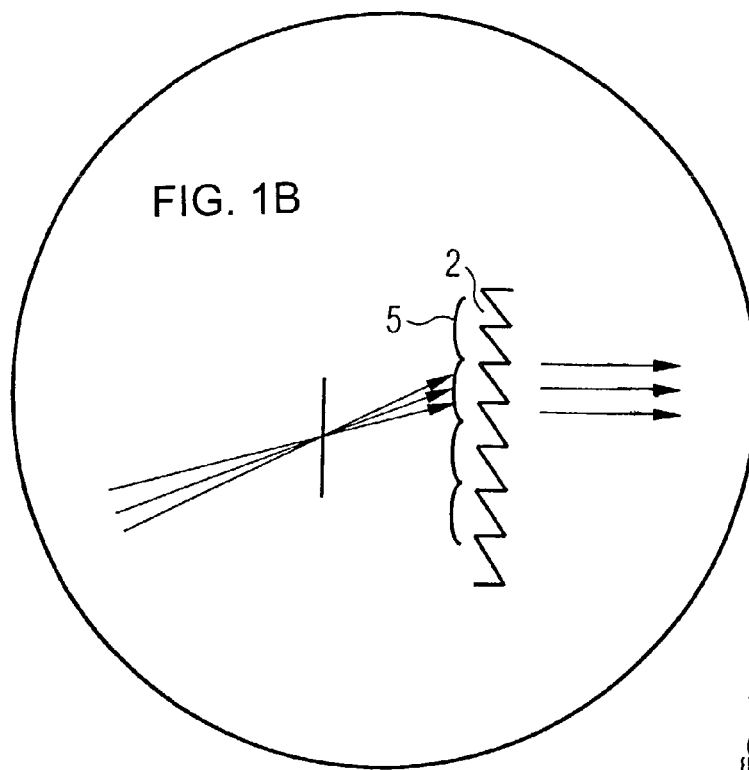
FIG. 1B is an enlarged, fragmentary, cross-sectional view of a portion of the signaling device of FIG. 1A.
Figure 1A:
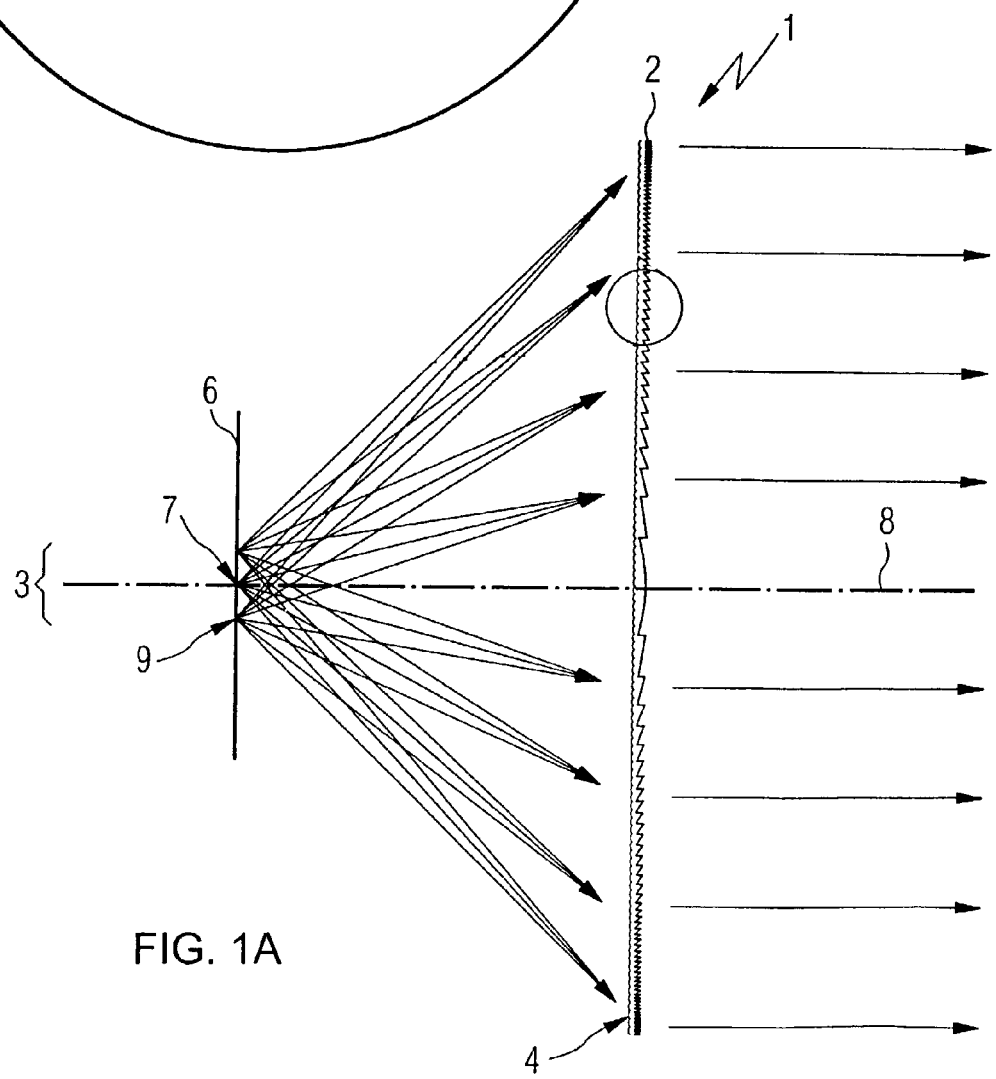
FIG. 1A is a fragmentary, cross-sectional view through a signaling device according to the invention having a flat Fresnel plate.

Referring now to the figures of the drawings in detail and first, particularly to FIGS. 1A and 1B thereof, there is shown a cross-section through a signaling device 1 that has a light source 3 disposed in the focal plane of a Fresnel plate 2. The Fresnel plate 2 has prominences 5 on the rear side 4 facing the light source 3. The prominences 5 are defocusing lenses 5 of short focal length. Consequently, focal planes 6 that lie between the light source 3 and the Fresnel optical system 2 are associated with the defocusing lenses 5.

Without the defocusing lenses 5, the Fresnel plate 2 aligns light beams emanating from a central region 7 of the light source 3 in a fashion parallel to an optical axis 8. Beams emanating from edge region 9 of the light source 3 are guided by a Fresnel plate 2 without defocusing lenses 5 in a direction that assumes an angle to the optical axis 8.

Figure 2B:
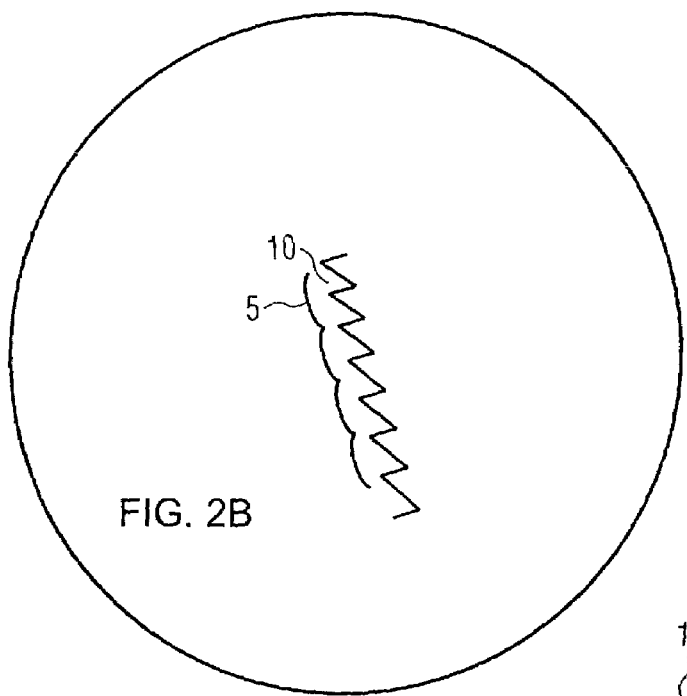
FIG. 2B is an enlarged, fragmentary, cross-sectional view of a portion of the signaling device of FIG. 2A.
Figure 2A:
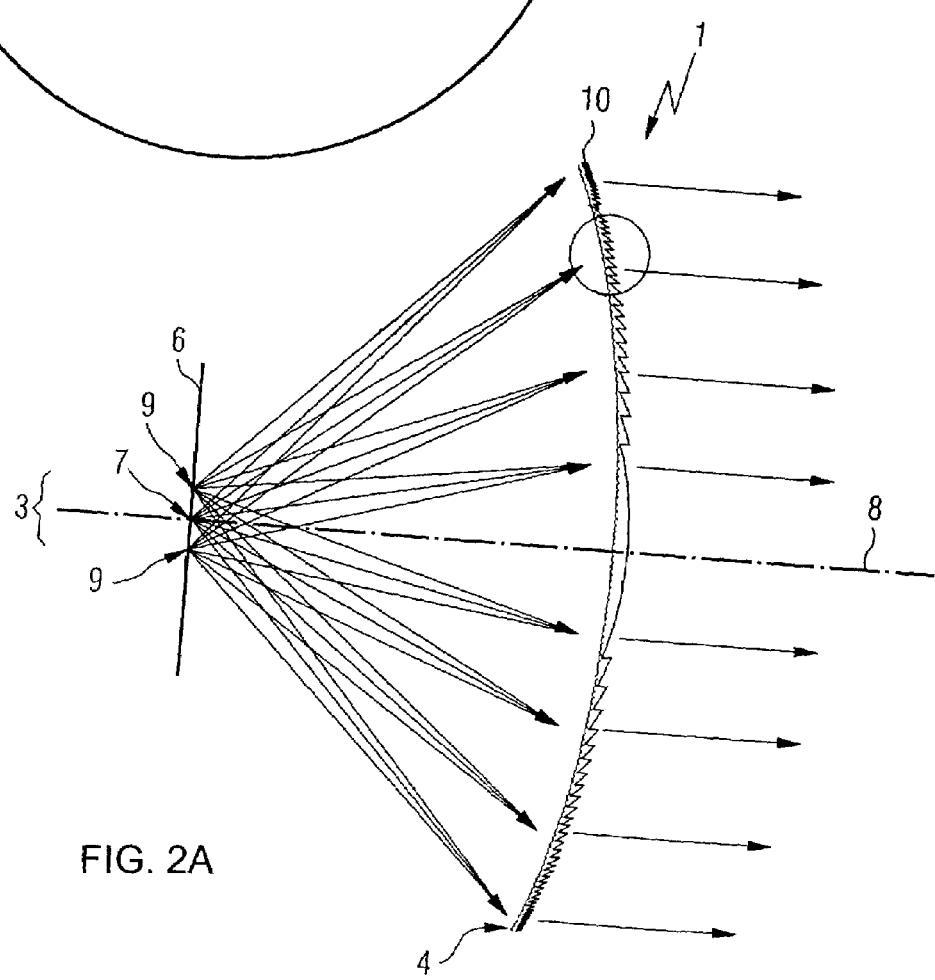
FIG. 2A is a fragmentary, cross-sectional view through an alternative embodiment of the signaling device according to the invention with a Fresnel lens.

Illustrated in FIGS. 2A and 2B is a modified embodiment of the signaling device 1 in which the Fresnel plate 2 is replaced by a Fresnel lens 10. The use of the Fresnel lens 10 has the advantage that, by comparison with the configuration of FIG. 1, the light beams emanating from the light source 3 impinge on the rear side 4 of the Fresnel lens 10 at a smaller angle, which results in larger transmission coefficients and a better efficiency of the optical system.

Figure 3:
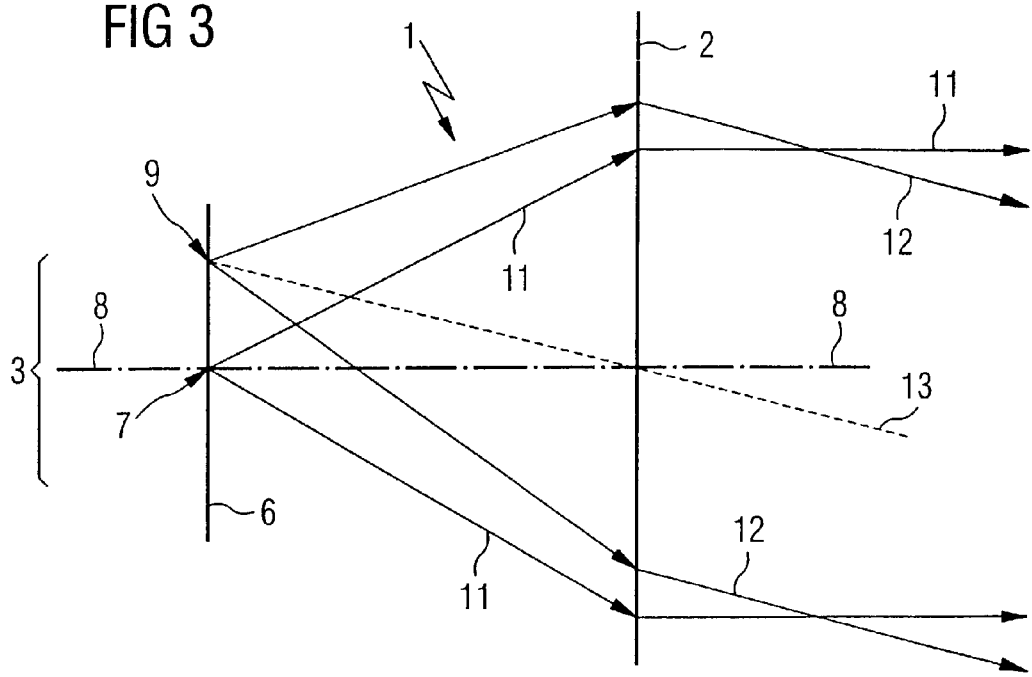
FIG. 3 is a side view of a ray-tracing diagram illustrating imaging without defocusing lenses.

For the sake of clarity, a side view of the signaling device 1 of FIG. 1 is illustrated, once again, in FIG. 3. It is clear from FIG. 3 that light beams 11 emanating from the central region 7 are combined to form a light beam aligned parallel to the optical axis 8. By contrast, light beams 12 emanating from edge regions 9 are combined to form light bundles running along a minor optical axis 13.

Figure 4:
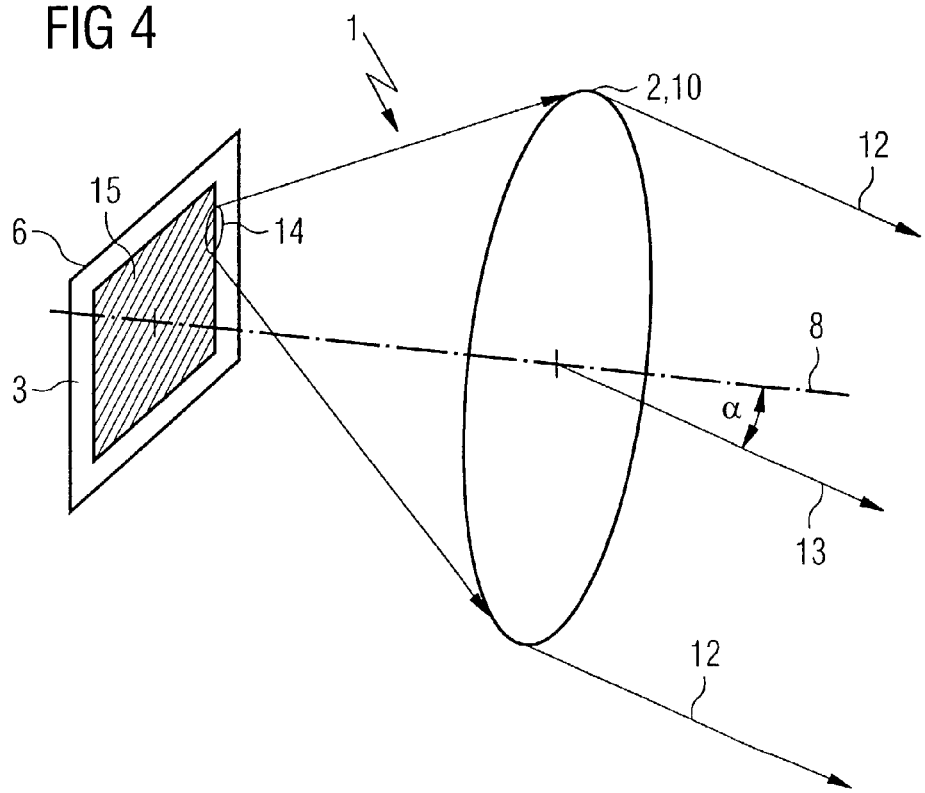
FIG. 4 is a perspective view of a ray-tracing diagram illustrating imaging with the Fresnel optical system according to the invention with spherical defocusing lenses.

FIG. 4 shows a perspective view that illustrates the action of the defocusing lenses 5 on the rear side 4 of the Fresnel plate 2 or the Fresnel lens 10. Due to the action of the defocusing lenses 5, light beams 12 incident along the minor optical axis 13 in the focal plane 6 are imaged not at a focal point, but on an areally extended focal area 14. Conversely, it holds that light is emitted in the direction of the minor optical axis 13 whenever at least one point of light of the light source 3 is situated inside the focal area 14.

In the case of the example illustrated in FIG. 4, the focal area 14 is situated on the edge of a luminous area 15 of the light source 3. Because the focal area 14 is not situated entirely on the luminous area 15, less light is emitted by comparison with the case in which the focal area is situated entirely on the luminous area 15. However, this can be taken for granted because only small luminosities are described for large aperture angles α. Due to the configuration of the defocusing lenses 5 on the rear side 4 of the Fresnel plate 2 or the Fresnel lens 10, it is, therefore, possible to produce ray bundles with large aperture angles α with the aid of a small light source 3.

Figure 5:
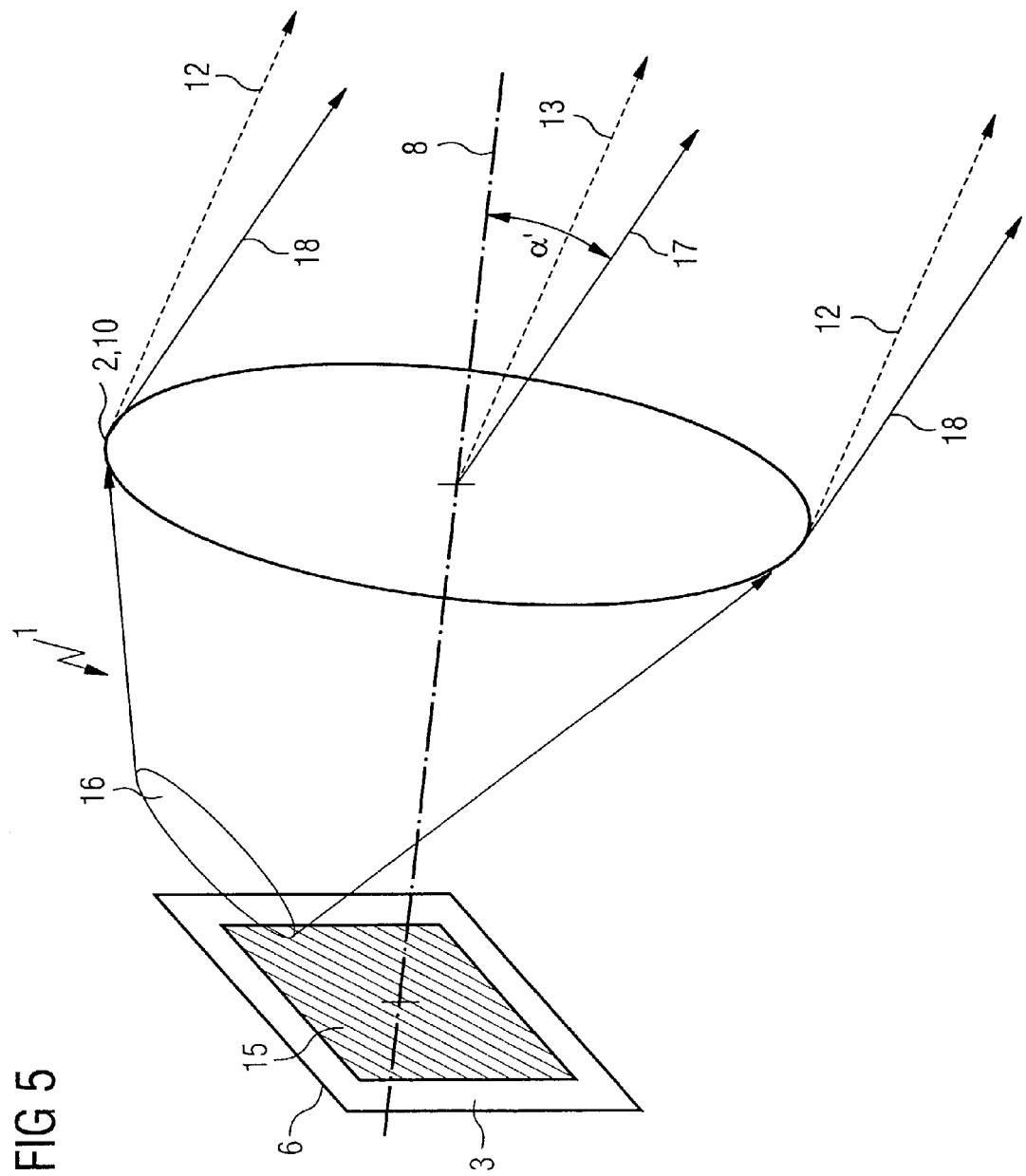
FIG. 5 is a perspective view of a ray-tracing diagram illustrating imaging with the Fresnel optical system according to the invention with elliptical defocusing lenses.

Such an effect can be further amplified when, as illustrated in FIG. 5, elongated defocusing lenses 5 are used instead of the spherical defocusing lenses. Such defocusing lenses 5 have an elliptical base area, for example, on the rear side 4 of the Fresnel plate 2 or the Fresnel lens 10. The defocusing lenses 5 can also be segments of ellipsoids.

Consequently, an elongated focal area 16 also results in the focal plane 6. It suffices, when the focal area 16 comes to be situated partly on the luminous area 15, to emit light beams 18 in the direction of an associated minor optical axis 13. A radiation characteristic with a larger aperture angle α', therefore, results in the case of the use of elongated defocusing lenses 5 in conjunction with the same extent of the light source 3.

The aperture angle α is usually to be approximately 60° in the horizontal direction and approximately 30° in the vertical direction. Consequently, the ellipsoidal defocusing lenses 5 situated next to one another on the rear side 4 must be disposed such that the long half axis is aligned vertically.

In the case of a modified exemplary embodiment, the Fresnel optical system is replaced by a parabolic mirror in whose focal plane the light source 3 is disposed.

I claim:
1. A signaling device for traffic signals, comprising:
    a traffic signal light source; and
    a traffic signal collimator being a Fresnel optical system associated with said light source, said Fresnel optical system having a surface facing said light source, said surface being a rear side of said Fresnel optical system and said surface having contiguously disposed scattering elements formed as prominences elongated in a direction along and disposed on said rear side surface.
2. The signaling device according to claim 1, wherein said light source has a field with light-emitting diodes.
3. The signaling device according to claim 1, wherein said Fresnel optical system is a Fresnel lens.
4. The signaling device according to claim 1, wherein said Fresnel optical system is a Fresnel plate.
5. The signaling device according to claim 1, wherein:
    said collimator has a focal plane; and
    said light source is disposed in said focal plane of said collimator.
6. The signaling device according to claim 1, wherein said prominences have elliptical base areas on said surface of said collimator.
7. The signaling device according to claim 6, wherein said prominences are formed by segments of ellipsoids.
8. The signaling device according to claim 6, wherein said prominences are segments of ellipsoids.
9. The signaling device according to claim 1, wherein:
    said collimator has a focal plane; and
    said light source is disposed at said focal plane of said collimator.
10. In a traffic signaling device having a light source, a focusing device, comprising:
    a collimator associated with said light source, said collimator being a Fresnel optical system selected from the group consisting of a Fresnel lens and a Fresnel plate, said Fresnel optical system having a surface facing said light source, said surface being a rear side of said Fresnel optical system and said surface having contiguously disposed scattering elements formed as prominences elongated in a direction along and disposed on said rear side surface.
11. The signaling device according to claim 10, wherein said prominences have elliptical base areas on said surface of said collimator.
12. The signaling device according to claim 11, wherein said prominences are formed by segments of ellipsoids.
13. The signaling device according to claim 10, wherein said collimator has a focal plane at which the light source is disposed.
14. The signaling device according to claim 10, wherein the light source has a field with light-emitting diodes.
15. A signaling device for traffic signals, comprising:
    a traffic signal light source; and
    a traffic signal collimator associated with said light source, said collimator being a Fresnel optical system selected from the group consisting of a Fresnel lens and a Fresnel plate, said Frensnel optical system having a surface facing said light source, said surface being a rear side of said Fresnel optical system and said surface having contiguoulsy disposed scattering elements formed as prominences elongated in one direction along and disposed on said rear side surface.

* * * * *